UNITED STATES PATENT OFFICE.

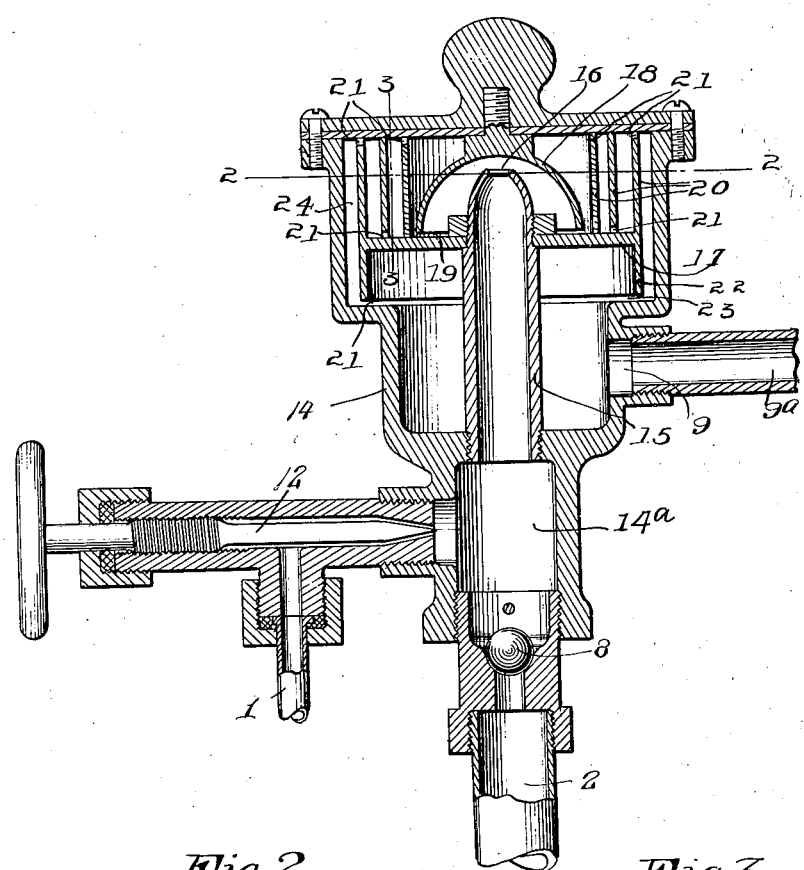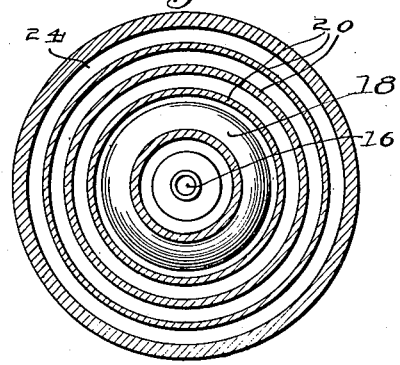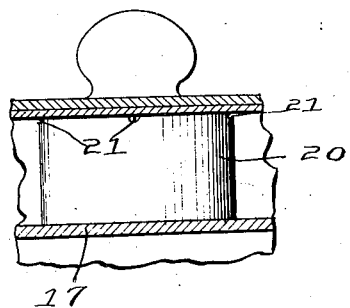

CROCKER H. SANFORD, OF BALTIMORE, MARYLAND, ASSIGNOR, BY DIRECT AND MESNE ASSIGNMENTS, TO THE OLD DOMINION SPECIALTY CO., INC., OF BALTIMORE, MARYLAND, A CORPORATION OF MARYLAND.

MIXING DEVICE.

1,328,204.    Specification of Letters Patent.    Patented Jan. 13, 1920.

Application filed July 19, 1918. Serial No. 245,710.

*To all whom it may concern:*

Be it known that I, CROCKER H. SANFORD, a citizen of the United States, residing in the city of Baltimore and State of Maryland, have invented new and useful Improvements in Mixing Devices, of which the following is a specification.

My present invention pertains to devices for mixing or commingling fluids, and consists in a mixing device designed more especially for incorporation in the gas and water mixing apparatus constituting the subject of my contemporary application filed April 18, 1919, Serial No. 291,078, though it is to be understood that the said mixing device is adapted to be used to advantage in various other connections.

The object of my present invention is to provide a mixer calculated to handle fluids under pressure and constructed in such manner as to conduct the fluids in company through a tortuous course, meanwhile retarding and reducing the same to thin films and small jets and battering the same against opposed abutments, all with a view to assuring intimate contact of the fluids and thorough commingling thereof.

With the foregoing in mind the invention will be fully understood from the following description and claims when read in connection with the drawings, forming part hereof, in which:

Figure 1 is a diametrical section of the mixer constituting the best practical embodiment of my invention of which I am aware.

Figs. 2 and 3 are sections of the same, taken in the planes indicated by the lines 2—2 and 3—3, respectively, of Fig. 1.

My novel mixer will be readily understood as comprising a casing 14, having a chamber 14$^a$, a central nozzle 15, having a reduced orifice 16, a wall or partition 17 surrounding said nozzle, a preferably concavo-convex baffle 18 opposed to and spaced from said orifice and having its edge closely arranged to wall or partition 17 so as to afford between the two a minute passage 19, three more or less spaced walls 20 surrounding the baffle and each having one or more minute apertures or passages 21, and an annular wall 22 depending from the marginal edge of the partition 17 and having a minute space 23 between its lower edge and the opposed wall of the casing. Minute apertures might be employed in lieu of the said space 23, though I prefer the latter. The wall 22 is preferably a continuation of the outer wall 20, and an annular space 24 is formed between the said outer wall 20—22, and the adjacent portion of the casing wall.

The mixer is designed more especially for use in conjunction with a pipe 1 from a source of carbonic acid gas supply and a pipe 2 from a street main or other source of water supply. Communication between the pipe 1 and the interior of casing 14 is controlled by a valve 12, and intermediate the pipe 2 and the nozzle 15 a non-return valve 8 is provided in order to prevent carbonated water from affecting the character of the water conducted in the several pipes of a house.

My novel mixer is designed to bring about thorough commingling of fluids, especially water and gas, or thorough impregnation of the former with the latter, and when it is remembered that the water and gas enter the lower end of the nozzle 15 together, the efficiency of the mixer will be readily appreciated when it is stated that the column of water and gas is contracted by the orifice 16 and jetted against and spread over the concave surface of the baffle 18 which contributes materially to the commingling action. The water and gas are then carried in the form of a thin film outwardly through the space 19 which contributes to the commingling action after which the water and gas are carried in a tortuous manner through the apertures or passages of the annular walls and between said walls and then through the annular space 24 and the passage 23 into the chamber of the mixer that communicates with the discharge orifice 9. In communication with the orifice 9 is a pipe 9$^a$ which preferably leads to a valved outlet as shown in my contemporary application hereinbefore cited. Incidental to the lateral movement of the water and gas it will be noted that the same will first be jetted through the passage 19, and then through the apertures 21 of the inner wall 20 against the imperforate portion of the intermediate wall 20, then after passing downwardly will be jetted through the apertures 21 of the intermediate wall 20 against the outer wall 20, then after passing upwardly between the intermediate and outer walls 20 will be jetted through the apertures 21 of the outer wall 20 against the casing wall, and then after passing downwardly in the space 24 will be charged through the passage 23 into the discharge chamber of the mixer. In this way the water and gas will be carried in a tortuous manner through the mixer, will be retarded *en route* and thrown in small portions violently against abutments with the result that when the water and gas reach the discharge chamber of the mixer they will be commingled to a high degree of intimacy.

The mixer is designed more especially for use in a soda water dispensing apparatus.

Having described my invention what I claim and desire to secure by Letters-Patent is:

1. A fluid mixing device, comprising a casing having a chamber in which are inlet orifices for fluids and also having an outlet orifice, and also having intermediate said chamber and the outlet orifice a nozzle, a baffle opposed to the eduction orifice of the nozzle and to a wall around the nozzle, and spaced walls grouped about the baffle and having minute passages at staggered points, whereby the fluids are reduced to films and jets and are battered against imperforate portions of some of the walls.

2. A fluid mixing device, comprising a casing having a chamber in which are inlet orifices for fluids and also having an outlet orifice, and also having intermediate said chamber and the outlet orifice a nozzle, a concavo-convex baffle opposed to the eduction orifice of the nozzle and to a wall around the nozzle, and spaced walls grouped about the baffle and having minute passages at staggered points whereby the fluids are reduced to films or jets and are battered against imperforate portions of some of the walls.

3. A mixing device, comprising a casing having a chamber in which are inlet orifices for fluids and also having an outlet orifice, a nozzle secured in the casing in communication with the chamber and the outlet orifice and having a contracted discharge, a wall surrounding said nozzle, a concavo-convex baffle arranged with its concave surface opposed to the discharge of the nozzle and its edge slightly spaced from said wall, and annular spaced walls surrounding the baffle and having minute passages at staggered points.

In testimony whereof I affix my signature.

CROCKER H. SANFORD.